United States Patent [19]

Anderson et al.

[11] Patent Number: 5,306,632
[45] Date of Patent: Apr. 26, 1994

[54] POROUS ACRYLONITRILE POLYMER SUBSTRATE FOR BONDING LIGANDS AND SEPARATING BIOLOGICALLY ACTIVE SUBSTANCES

[75] Inventors: Larry S. Anderson, Morwall, Conn.; Michael T. Cooke, New York, N.Y.; David A. Ley, New Canaan, Conn.

[73] Assignee: Cytec Technology Corp., Wilmington, Del.

[21] Appl. No.: 22,223

[22] Filed: Feb. 25, 1993

Related U.S. Application Data

[63] Continuation of Ser. No. 399,199, Aug. 28, 1989, abandoned, which is a continuation-in-part of Ser. No. 276,183, Nov. 23, 1988, abandoned.

[51] Int. Cl.$^5$ .................... C12N 11/08; C12N 11/06; G01N 33/546; G01N 33/549
[52] U.S. Cl. .................... 435/180; 435/181; 435/815; 436/532; 436/533; 436/824; 526/341; 526/342; 530/413
[58] Field of Search ............... 435/174, 180, 181, 182, 435/815; 436/532, 533, 824; 526/341, 342; 530/413

[56] References Cited

U.S. PATENT DOCUMENTS

| | | | |
|---|---|---|---|
| 3,959,080 | 5/1976 | Orth et al. | 435/181 X |
| 4,110,529 | 8/1978 | Stoy | 528/491 |
| 4,143,203 | 3/1979 | Rigopulos et al. | 436/533 |
| 4,195,128 | 3/1980 | Hildebrand et al. | 435/181 X |
| 4,246,351 | 1/1981 | Miyake et al. | 435/182 |
| 4,371,612 | 2/1983 | Matsumoto et al. | 435/180 X |
| 4,693,985 | 9/1987 | Degen et al. | 435/180 X |
| 5,047,437 | 9/1991 | Cooke et al. | 521/56 |

Primary Examiner—David M. Naff
Attorney, Agent, or Firm—Frank M. Van Riet

[57] ABSTRACT

A porous shaped substrate such as a porous bead is formed from polyacrylonitrile or a copolymer thereof containing nitrile groups. The substrate has a hydrophilic surface containing amide groups constituting about 1.8 mole percent to less than about 15 mole percent of the total nitrile groups, and containing no amide or carboxyl groups. The substrate is substantially non-swellable in water and is able to resist pressures in a columnar bed of up to about 3000 psi without collapsing. In forming the amide groups, polyacrylonitrile or copolymer thereof containing nitrile groups, an alkaline catalyst such as sodium hydroxide and a nonsolvent for the substrate such as methanol are combined to form a suspension. A peroxide is added to the suspension and the suspension is heated to hydrolyze nitrile groups to amide groups. Succinylated aminoethyl groups or activated carboxyl groups can be formed on the substrate and a bioactive ligand such as p-aminobenzamidine covalently bonded to the substrate. The bound ligand can then be used to complex a biologically active substance such as an enzyme to separate the substance from solution.

66 Claims, No Drawings

POROUS ACRYLONITRILE POLYMER SUBSTRATE FOR BONDING LIGANDS AND SEPARATING BIOLOGICALLY ACTIVE SUBSTANCES

This application is a continuation of U.S. application Ser. No. 07/399,199, filed Aug. 22, 1989, now abandoned, which is a continuation-in-part of U.S. application Ser. No. 07/276,183 filed Nov. 23, 1988, now abandoned.

This application is related to commonly assigned applications of Michael Timothy Cooke and Laura Jean Hiscock for Porous Polyacrylonitrile Beads and Process, U.S. application Ser. No. 07/275,317, now U.S. Pat. No. 5,047,438, Michael Timothy Cooke and Laura Jean Hiscock, for Porous Polymer Beads and Process, U.S. application Ser. No. 07/275,256, now abandoned, and David Arthur Ley, Laura Jean Hiscock and Michael Timothy Cooke for Process for the Preparation of Porous Polymer Beads, U.S. application Ser. No. 07/275,170, now U.S. Pat. No. 4,940,734, all of which were filed on Nov. 23, 1988.

This invention relates to substrates such as substantially skinless isotropic porous beads having a core comprising an acrylonitrile polymer or copolymer thereof and an amide surface; and an improved process for their production. Particularly, this invention relates to porous polyacrylonitrile beads with amine or carboxyl functional groups attached. In another embodiment, this invention relates to surface hydrated porous polyacrylonitrile substrates, such as beads, having substantially no byproduct imide or carboxyl groups on the surface. Further, this invention relates to substrates, such as porous polyacrylonitrile beads, with functionalized derivatives to form complexes with biologically active substances to separate said substances from solutions. Such beads are ideally suitable for application in chromatography separation processes, whereas other substrates such as hollow fibers and membranes may be utilized in separations such as kidney dialysis.

BACKGROUND OF THE INVENTION

Rigid non-swellable polymeric materials having neutral, hydrophilic surfaces are useful for many applications protein solutions. These include chromatography supports, membranes, carriers for immobilized enzymes or immunoassay supports. Hydration of polyacrylonitrile surfaces to form acrylamide groups is well known in the art.

Stoy, U.S. Pat. No. 4,110,529, discloses introducing reactive groups into the surface layer of beads during coagulation. Example 5 of the Stoy patent discloses the partial hydration of a polyacrylonitrile to 40 percent amide groups and then coagulating to form porous beads. However, beads prepared in this manner are highly swellable in water and contain a substantial amount of byproduct carboxylate groups in addition to the desired amide groups. Thus, the beads are not particularly useful as chromatographic supports. Their tendency to swell results in excessive pressure drops and inconsistent flow rates in chromatographic columns and the presence of carboxylate groups causes non-specific binding in separation processes not involving ion exchange. Problems also arise from the high, 40%, amide conversion rate as high conversion to amide groups results in significant losses in chromatographic flow due to loss of bead rigidity.

Other attempts to convert nitrile groups to amides in the prior art have involved treatment with strong acids or bases. Both of these techniques generally lead to some formation of surface carboxyl groups Rigopolous, U.S Pat. No. 4,143,203 discloses solid particles possessing an impermeable rigid polyacrylonitrile core with a hydrolyzed surface. The surface is hydrolyzed by heating the solid poly-acrylonitrile particles in a solution of sulfuric acid at temperatures ranging from 75° to 95° C. However, beads formed under these conditions are non-porous and have a substantial amount of byproduct carboxyl groups; and thus are not useful in non-ion exchange protein specific chromatographic applications.

The surface modification of polyacrylonitrile under basic conditions was studied by K. Ohta et. al., *Nippon Kagaku Kaishi*, 6, 1200 (1985) using surface infra red spectroscopy. After treating polyacrylonitrile films with 5 percent sodium hydroxide for 4 hours at 70° C., Ohta found 4.5 percent amide and 5.7 percent carboxylate groups on the surface. Treatment of the film with 5 percent sodium hydroxide and 15 percent hydrogen peroxide (an aqueous alkaline peroxide reaction) for 4 hours at 70° C. gave 2.1 percent amide and 0.7 percent carboxylate. These treatments are also not sufficiently selective.

Thus, the present state of the art still possesses serious drawbacks to the formation of highly selective non-swellable highly porous acrylonitrile polymeric beads having neutral hydrophilic surfaces. The greater surface area of highly porous beads and the narrow diameter of the polymer structure, makes it critical to accurately control the extent of hydration. Conversion of more than 10 percent of the nitrile groups to amide groups results in significant losses in flow in chromatography separations. It is difficult to accurately control the extent of reaction with acidic hydration. Acidic hydration is also known to have a strong neighboring group effect which generates a "block" polymer structure. A block polymer structure at low conversion can result in non-uniform coverage of the surface. Again, this causes problems with non-specific binding in chromatography applications. A third problem with acidic hydration is the formation of carboxyl and imide groups. The presence of carboxyl groups causes undesired ion interactions during size exclusion or affinity chromatography applications.

Surprisingly, the present inventors have found that alkaline peroxide hydration of nitriles, with careful control of the solvent can avoid these problems. The reaction selectively converts nitriles groups to amide groups without side reactions to imide or carboxyl groups. By controlling the solvent, the reaction can be easily controlled and actually stopped at low conversion. The use of solvent, preferably methanol, allows all of the surfaces of the polymer, even those present in small pores, to be converted. This results in an even distribution of amide groups on the surface of the polyacrylonitrile core. Also discovered is a method by which the amide groups, the nitrile groups, or a combination thereof can be reduced to generate amine functionality. Furthermore, a method has been found to succinylate the amine groups to generate carboxyl functionality. The attachment of a bioactive ligand by carbodimide activation of the carboxyl groups has been found to effectively form complexes with enzymes, hormones, or mixtures thereof for biological separation techniques.

Furthermore, the rigid nature of the polyacrylonitrile core is minimally effected by this mild treatment and thus, the products of this invention are substantially non-swellable in water and noncompressible. When used herein and in the appended claims the term "noncompressible" means able to resist hydrostatic pressures in columnar beds of up to about 3000 psi, without collapsing.

SUMMARY OF THE INVENTION

In accordance with the present invention there are provided substrates comprising a core of polyacrylonitrile or a copolymer thereof comprising acrylonitrile and at least one comonomer and less than about 15 mole percent of amide groups, based on total nitrile groups, evenly distributed over the entire surface area, including pore channel walls, with substantially no imide or carboxyl groups on said surface area, said substrates being substantially non-swellable in water and non-compressible.

In a preferred configuration, the substrate is a substantially skinless porous bead having a pore volume of not substantially less than 1.5 ml/g and being substantially isotropic. Preferably the average pore diameter is from about 0.002 microns to about 5 microns and the average bead diameter is from about 5 microns to about 2 millimeters.

Also in accordance with the present invention there are provided processes for the preparation of substrates such as substantially skinless porous polymer beads, comprising a core of polyacrylonitrile or a copolymer thereof, and less than 15 mole percent of amide groups, based on total nitrile groups, evenly distributed over the entire surface area thereof, said process comprising (a) combining in suspension in a liquid non-solvent for the polymer or copolymer;
  (i) the substrate comprising poly-acrylonitrile or a copolymer of acrylonitrile and at least one co-monomer, prepared by a thermal induced phase separation process; and
  (ii) an alkaline catalyst;
(b) adding a peroxide to said suspension and heating for a time sufficient to convert up to about 15 mole percent of the total surface nitrile groups are hydrolyzed to amide groups;
(c) and recovering the surface-modified substrate.

Preferably the liquid non-solvent comprises methanol, the alkaline catalyst comprises sodium hydroxide and the peroxide comprises hydrogen peroxide. The recovery step may comprise a washing procedure utilizing salts, water, and buffer solutions. It is also contemplated that a reaction additive, such as dimethylsulfoxide, is added to the suspension and that the substrate is annealed prior to combining in suspension. Subsequently, reducing agents may also be used to reduce at least part of the amide groups, the nitrile groups or both to form functional amine groups. The amine groups may be further succinylated to generate carboxyl functionalities. By activating the carboxyl groups by reacting with any species known to activate —COOH groups, such as carbodiimide, a bioactive ligand may be attached. The bead with such an attachment may be used to bind with enzymes, including lipases and proteinases such as acetylcholinesterase, to bind with hormones, and to bind with proteins such as human serum albumin, bovine serum albumin, hemoglobin, ovalbumin, myoglobin, alpha-lactalbumin, thyroglobin, and bovine serum gamma globulin, for biological separation processes.

DETAILED DESCRIPTION OF THE INVENTION

Substrates comprising polyacrylonitrile homopolymers or copolymers are generally known. For instance, semi-permeable membranes of polyacrylonitrile are utilized in various chemical separations. Hollow fibers of polyacrylonitrile, such as those marketed by Asahi Medical Company Ltd under the designation PAN 140, are currently used in kidney dialysis equipment.

Porous beads comprising acrylonitrile polymers or copolymers are known to those skilled in the art and utilizable in the practice of the present invention. One method for preparing porous copolymers is described in U.S. Pat. No. 4,246,352. A preferred method of preparing porous polyacrylonitrile beads is disclosed in commonly assigned copending U.S. Pat. applications, Cooke and Hiscock, Ser. No. 07/275,317 and Ley, Hiscock, and Cooke U.S. application Ser. No. 07/275,170, and Cooke and Hiscock, U.S. application Ser. No. 07/275,256. The thermally induced phase separation process disclosed therein provides microporous beads comprising acrylonitrile polymers or copolymers which are substantially skinless, isotropic, and have a high pore volume. Such beads are preferred as the substrate used in the practice of the present invention. Such porous bead substrates are among the preferred substrates used in the practice of the present invention. Also preferred are polyacrylonitrile substrates such as non-porous sheets or films, porous membranes, hollow fibers including porous fiber, monofilaments, acrylic yarns and fibrillated fibers. Also included are structures comprising one or more of the above-identified substrates. It should therefore be readily apparent that the form of the substrate is not critical to the practice of the invention disclosed herein.

As mentioned above, the polyacrylonitrile substrates may comprise acrylonitrile homopolymers or copolymers Suitable comonomers comprise $C_2$-$C_6$ monoolefins, vinyl aminoaromatics, alkenyl aromatics, vinyl aromatics, vinyl halides, $C_1$-$C_6$ alkyl(meth)acrylates, acrylamides, methacrylamides, vinyl pyrrolidones, vinyl pyridine, $C_1$-$C_6$ hydroxyesters of alkyl(meth)acrylates, meth(acrylic)acids, acrylomethylpropylsulfonic acids, N-hydroxy-containing $C_1$-$C_6$ alkyl(meth acrylamide, acrylamidomethylpropylsulfonic acids, vinyl acetate, glycidyl (meth)acrylate, glycerol (meth)acrylate, tris(hydroxymethyl)aminomethyl (meth)acrylamide or a mixture thereof. Acrylonitrile copolymers may comprise from about 99 to about 20 parts by weight acrylonitrile and from about 1 to about 80 parts by weight comonomer. It is preferable that the acrylonitrile be present in greater than about 90 mole percent and the preferred comonomer comprises methyl acrylate.

The surface of the acrylonitrile substrates is hydrolyzed to form amide groups by reacting the nitrile surface groups with an alkaline peroxide in a liquid on-solvent for the polymer The reaction selectively hydrates nitrile groups to amide groups without side reactions to imide or carboxyl groups. Furthermore, the process of this invention is surprisingly easily controlled and conversions of less than 15 mole percent nitrile groups to amide groups are readily obtainable In general, the process comprises forming a suspension of the acrylonitrile substrate and non-solvent, and optionally water. It is also contemplated to introduce a catalyst into the suspension. The suspension is stirred and an alkaline reagent added. The suspension is then heated, a peroxide added, the suspension stirred, and the reaction is carried out to the desired extent.

Suitable peroxides for use in the practice of the present invention comprise hydrogen peroxide, t-butyl hydroperoxide, or mixtures thereof, and the like. Especially preferred is hydrogen peroxide Many alkaline reagents are known to those skilled in the art and are suitable for use in this invention. Alkaline reagents comprise sodium hydroxide, potassium hydroxide, or mixtures thereof, and the like.

Essential to the practice of the present invention is the choice of a suitable non-solvent for the acrylonitrile polymer or copolymer. The non-solvent must however also be a solvent for the alkaline reagent and peroxide. The choice and concentration of the components of the solvent non-solvent system is believed to control the selectivity and extent of the reaction. Although applicants do not wish to be bound by any theory, it is believed that the ability of the solvent system to solvate the amide groups as they are formed controls the extent of the reaction. Thus by controlling the solvent to non-solvent ratio, the extent of the conversion can be controlled. Preferably, where hydrogen peroxide is the peroxide and sodium hydroxide is the alkaline reagent, methanol is employed as non-solvent.

The recovery step may also comprise a washing procedure catalytically reduced to form functional amine groups. The amine groups may be further succinylated to generate carboxyl functionality at the terminus of the pendant group. Activating the carboxyl groups with carbodiimide will allow the attachment of a bioactive ligand. Beads containing bioactive ligands such as para aminobenzamidine (PABA) may be used in biological separation processes to bind with enzymes, such as acetylcholinesterase.

In a preferred embodiment, the substrate beads are annealed prior to their introduction into the suspension with the non-solvent. The annealing step is most preferably carried out in two stages. First, the beads are heated to a temperature above about 50° C. in a non-solvent. Suitable non-solvents include water, lower alcohols and $C_1$ and $C_8$ hydrocarbons. The beads are then dried at a temperature of less than 50° C. and then heated to 90°–100° C. for about 30–60 minutes. It appears that the first step (heating in a non-solvent) eliminates bead agglomeration in the second step. The annealing step appears to decrease the reactivity of the bead. Although applicants do not wish to be bound by any single theory, it is postulated that this occurs by the polymer becoming more ordered and/or decreasing the surface area. Annealing, thus represents a further method of control of the nitrile to amide group reaction.

DESCRIPTION OF THE PREFERRED EMBODIMENTS

The following examples illustrate the present invention. They are not to be construed to limit the claims in any manner whatsoever.

The following procedure is used to prepare porous polymer beads comprising polyacrylonitrile or a copolymer thereof suitable for use as substrates for surface-hydration.

Porous beads are made from acrylonitrile polymers and/or copolymers. The acrylonitrile copolymers preferably comprise polyacrylonitrile copolymerized with, for example, a ($C_2$–$C_6$) mono-olefin, a vinylaromatic, a vinylaminoaromatic, a vinyl halide, a ($C_1$–$C_6$)alkyl(meth)acrylate a (meth)acrylamide, a vinyl pyrrolidone, a vinylpyridine, a ($C_1$–$C_6$) hydroxyalkyl (meth)acrylate, a (meth)acrylic acid, an acrylomethypropylsulfonic acid, an N-hydroxycontaining ($C_1$–$C_6$)alkyl (meth)acrylamide, or a mixture of any of the foregoing. Special mention is made of ($C_1$–$C_6$)alkyl (meth) acrylates.

As solvents for acrylonitrile polymers or copolymers, any organic or inorganic liquid capable of dissolving them without permanent chemical transformation can be used. These include dimethyl sulfoxide, dimethyl formamide, dimethyl sulfone, aqueous solutions of zinc chloride, and sodium thiocyanate.

Non-solvents for acrylonitrile polymers or copolymers may comprise any liquid medium which is immiscible therewith. These may comprise urea, water, glycerine, propylene glycol, ethylene glycol or mixtures thereof.

Non-solvent dispersants can comprise any liquid medium which is immiscible with the acrylonitrile polymers or copolymers and the polymer solvent. Usually, they will comprise liquids of low polarity, such as aliphatic, aromatic, or hydroaromatic hydrocarbons and their halogenated derivatives, low molecular weight polysiloxanes, olefins, ethers, and similar such compounds.

Preferred solvent-nonsolvent systems comprise a solvent mixture of dimethyl sulfone-urea-water or dimethyl sulfone with either water, propylene glycol, or ethylene glycol added.

Control of the external porosity and pore size distribution are both functions of the composition of the solution of polymer, solvent and non-solvent(s). The following are detailed methods of preparing these porous polymer beads.

Five grams of a wet copolymer containing 99 mole percent acrylonitrile and 1 mole percent of methyl acrylate (1:1 copolymer:water by weight) are ground with 5 grams of urea and 30 grams of dimethylsulfone to form a powered mixture. The mixture is place in a 1 liter flask with 100 ml of mineral oil heated to 160° C. The mixture is stirred until two liquids phases are present, one phase is a homogeneous polymer solution, the other mineral oil. Rapid stirring of the mixture with an overhead paddle stirrer gives a suspension consisting of droplets of the hot (about 120° C.) polymer solution in mineral oil. The droplets are cooled by transferring the suspension via a canula to a second stirred mixture consisting of 500 ml of mineral oil, 6 grams of dimethylsulfone, and 1 gram of urea kept at 70° C. The droplets solidify upon contacting the cooler mineral oil. The mixture is cooled with stirring to room temperature, then diluted with methylene chloride to reduce the viscosity of the oil. The droplets are collected on a Buchner funnel and washed with methylene chloride, then the solvent is extracted with 200 ml of acetone for 1.5 hours at room temperature. The resulting beads are examined by scanning electron microscopy and seen to be highly porous, with relatively uniform pore diameter of about 0.5 microns. The pores extend through the outer surfaces of the beads. The beads range in size from 10 microns to a few millimeters in diameter.

Another detailed example of preparing these porous polymer beads is as follows:

Two hundred eighty-eight grams of dimethylsulfone, 12 grams of acrylonitrile copolymer consisting of a 99:1 mole ratio acryonitrile: methyl acrylate, and 100 ml of propylene glycol are combined and placed in a Parr reactor equipped with a magnetically driven stirrer and dip leg. The reactor is heated to 140° C. to form a homogeneous solution. The solution is forced through heated, 140° C., lines and an atomization nozzle (for example, Lechler Co. full cone "center jet" nozzle, 0.46 in. diameter orifice) using 150 psig nitrogen pressure The nozzle is mounted 3 inches over 3 liters of stirred mineral oil or 4 inches over 4 liters of stirred heptane to quench the liquid droplets. The solidified droplets are washed with heptane to remove mineral oil, dried and extracted for one hour with 3 liters of 85°–90° C. water to produce microporous beads. Pore sizes ranges from 0.5 to 1.5 microns and the majority of the beads are between 25 and 150 microns.

EXAMPLE 1

A suspension of 5 grams of dry annealed polyacrylonitrile beads (45–90mm, 94.5 m moles) in 115 ml of methanol and 4 ml of dimethylsulfoxide (56.4m moles) were stirred under a nitrogen purge. After ten minutes of purging, 2.4 ml of 2N aqueous sodium hydroxide (4.8m moles) were added to the suspension and the suspension heated to 35° C. Hydrogen peroxide, 4.9 ml of a 30 percent solution (0.96 m moles) was added over 10 minutes. The reaction mixture was stirred at 35° C. for three hours. After 3 hours, 2.4 ml of 2N hydrochloric acid (4.8m moles) was added and the reaction mixture was stirred for one minute and filtered. The beads were washed with 0.1N aqueous hydrochloric acid, water, methanol and then dried. The amide content of the beads was determined to be 8.3 percent by infra red analysis.

EXAMPLE 2

The procedure of Example 1 was followed, except that 5.6 ml of water was added to the reaction mixture prior to purging the suspension with nitrogen. The amide content of the beads was determined to be 9.5 percent by infra red analysis.

EXAMPLE 3

The procedure of Example 1 was followed, except that 14.7 ml of 30 percent hydrogen peroxide was used and the reaction was run at 35° C. for 45 minutes. The amide content of the beads was determined to be 9.2 infra red analysis.

EXAMPLES 4 AND 5

Porous 99/1 mole ratio acrylonitrile/methyl acrylate copolymer beads prepared by thermally induced phase inversion were stored in water after extraction of casting solvents. A sample was removed, dried and annealed at 95° C. for 0.5 hours. Both annealed beads and wet beads (0.2 g dry) were reacted with 0.16 mls dimethylsulfoxide, 0.58 mls 30 percent hydrogen peroxide and 0.1 mls 2N sodium hydroxide in 9 mls methanol. After three hours, the annealed beads had 1.8 percent amide conversion, while the non-annealed wet beads had 8.5 percent amide conversion. This further illustrates the level of control of conversion possible through use of the present invention.

EXAMPLES 6–12

The procedure of Example 1 was followed varying the amounts of hydrogen peroxide and water. The results are set forth in Table 1 below.

TABLE 1

| Example | 6 | 7 | 8 | 9 | 10 | 11 | 12 | 6A* |
|---|---|---|---|---|---|---|---|---|
| Reaction Conditions (wt. ratio) | | | | | | | | |
| Nitrile bead | 1 | 1 | 1 | 1 | 1 | 1 | 1 | 1 |
| 30% H$_2$O$_2$ | 1.1 | 1.1 | 1.1 | 1.1 | 2.2 | 2.2 | 2.2 | 3.2 |
| H$_2$O | 0 | 0.7 | 1.5 | 2.3 | 0 | 0.8 | 1.5 | 0 |
| Methanol | 18.2 | 18.2 | 18.2 | 18.2 | 18.2 | 18.2 | 18.2 | 18.2 |
| Amide Conversion (%) | | | | | | | | |
| 3 hrs, 35° C., ±0.5 | 8.3 | 9.2 | 10.6 | 10.6 | 10.8 | 13.4 | 12.9 | 16.7 |
| 4 hours, 35%, ±0.5 | 8.6 | 10.0 | 11.6 | 11.8 | 11.7 | 14.3 | 14.5 | 19.8 |

*Control Samples

Table I demonstrates the ability to control the extent of amide conversion by varying the solvent to non-solvent ratio.

EXAMPLE 13

46 grams of porous beads, comprised of 99% mole ratio acrylonitrile copolymer and 1% mole ratio methyl acrylate, were prepared by thermally induced phase inversion. The beads were annealed and then reacted with 37.0 mls dimethylsulfoxide, 207.5 mls methanol, 133.2 mls of 30% hydrogen peroxide, and 21.7 mls of 2N sodium hydroxide. The mixture was heated to 50° C. while being stirred. After being kept at 50° C. for 1 hour, the beads were collected and washed with 0.6L of deionized water, 1.5L of 0.1N hydrochloric acid, 4.0L of deionized water, and 1.0L of methanol. After vacuum drying 44.1 g (96%) of beads were recovered. The amide content of the beads was determined to be 8.1% by FI-IR analysis.

EXAMPLE 14

The product of Example 13 was reacted with a complex comprised of 1500 ml dioxane and 700 ml borane-tetrahydrofuran. This mixture was refluxed at 85° C. for 4 hours in a dry 5L flask which was fitted with a condenser. After cooling, the excess borane was quenched by slowly adding 1M hydrochloric acid. After 20 minutes, the beads were collected on a Buchner funnel, washed with water, methanol, and vacuum dried. The amine content of the beads was determined to be 184 mmoles amine/gram by the method of G. Antoni et. al., Analytical Biochemistry, 129,60–63, 1983.

EXAMPLE 15

26.1 g of the porous beads prepared by the procedure of Example 14 were mixed with a complex prepared by adding 313 g of powered succinic anhydride to 94 mls of deionized water, to which 313 mls of 1.0N sodium hydroxide was added. The solution was stirred to maintain a pH of 6.0. The beads were collected on a Buchner funnel and washed with 1.5L of deionized water, 3.0L of 0.1N hydrochloric acid, 3.0L of deionized water, and 1.0L of methanol. After vacuum drying, 25.1 g (96%) of beads were recovered. The residual amine content of the beads was determined to be 10 mmoles amine/gram by the Trinitrobenzene sulphonate (TBNS) amine assay.

EXAMPLE 16

10G of succinylated aminoethyl beads prepared by the procedure of Example 15 were soaked in 0.5M sodium chloride for 1 hour, washed 5 times with 100 ml of 0.5M sodium chloride, and washed 5 times with 100 ml of water. The washed beads were suspended in a solution of 100 ml of water which contained 500mg of p-aminobenzamidine to which 1N sodium hydroxide was added to maintain a pH of 5.0. 800mg of solid 1-ethyl-3 (3-dimethylaminopropyl) carbodiimide hydrochloride (EDAC) was added, to maintain a pH of 5.0, 1N sodium hydroxide was added dropwise, and the suspension was shaken at room temperature for 1 hour. An additional 800mg of solid EDAC was added and 1N sodium hydroxide was added to maintain pH 5.0. After the suspension was shaken at room temperature for 18 hours, the support was washed twice with 100 ml each of the following solutions, in the following sequence water, 0.5M sodium chloride, 0.2M NaOAc at a pH of 4.5, water, 0.1M sodium bicarbonate at a pH of 9.0, water, and 0.01M NaHPO$^4$ at a pH of 7.0 containing 0.02% sodium azide. The PABA content bound to the beads was determined to be 137 mmoles PABA/gram by analyzing the initial reaction suspension and the first wash sequence spectrophotometrically for PABA.

EXAMPLE 17

Porous beads containing o-aminobenzamidine, which were prepared by the procedure of Example 16, were packed by slurry addition into glass columns of 0.7 i.d. ×25 cm containing 0.01M NaHPO$_4$ with 0.02% sodium azide (run buffer) with 4.8 mg of acetylcholinesterase added to 0.25 ml of rum buffer. The column was eluted until the initial void peak eluted (20 ml–30 ml). The column was then eluted with run buffer containing 1M sodium chloride to recover any enzyme retained on the column. The salt elution volume was determined to have 6.0% to 21% recovered protein with 47% and 37% recovered activity. The acetylchlinesterase was assayed using Ellmans colormetric assay (Ellman, G. L., et. al., Biochem. Pharmac. 7. 88–108, 1961) and represented a 1.5 to 2.0 n fold purification of AChE.

EXAMPLE 18

Porous beads containing 8.1% amide, prepared by the procedure described in Example 13, were packed by slurry addition into a glass column of 0.7 i.d.×25 cm containing 0.1M sodium hypophosphate of pH 7.0 and 0.02% of sodium azide (run buffer). 5 ml of trypsin was added to the column in 0.25 ml of run buffer. The column was eluted until the initial void volume was eluted. The column was then eluted with run buffer containing 1M of sodium chloride to recover any enzyme retained on the column. The initial void volume was determined to contain 8.6% recovered protein with 7.8% activity. The salt elution was determined to have 53% recovered protein with 80% recovered activity. Therefore, the underivatized beads were absorbing/binding with trypsin which can be revived by salt elution. Protein values were determined by the BCA protein assay (Pierce Chemical Co., Rockford, Ill.).

The following Examples demonstrate the use of substrates other than porous polymer beads in the practice of the present invention.

EXAMPLE 19

Dry annealed polyacrylonitrile hollow fibers, 0.5 g, were mixed with 11.5 ml of methanol, 0.5 g of water, 0.24 ml of 2N aqueous sodium hydroxide solution, and 0.4 ml of dimethyl sulfoxide. The mixture was heated to 35° C., and 0.49 ml of a 30% hydrogen peroxide solution was added After standing at room temperature for 3 hrs., the reaction mixture was filtered The fibers were washed with water and methanol and vacuum dried (40° C.). The amide content of the fibers was determined to be 14.1% by infrared analysis.

EXAMPLE 20

The procedure of Example 19 was followed except that 0.50 g of a non-annealed fibrillated fiber sheet was used with 1.47 ml of 30 percent hydrogen peroxide solution, and the fiber was annealed before the reaction. IR analysis showed that the amide content of the fibrillated fiber product was about 2%.

EXAMPLE 21

The reaction procedure of Example 19 was followed except that 0.52 g of a nonporous film made from a 89.5:10.5 acrylonitrile:methyl acrylate film was used and the film was not annealed. Contact angle for water was 42° following the reaction while the initial film had a water contact angle of 63°.

The above mentioned patents, patent applications and references are incorporated herein by reference.

Many variations of the present invention will suggest themselves to those skilled in this art in light of the above detailed descriptions. For example, instead of hydrating acrylonitrile homopolymer or copolymers with methyl acrylate, other acrylonitrile copolymers such as acrylonitrile-vinyl chloride, and acrylonitrile-styrene may be used. Acrylonitrile copolymers in the form of hollow fibers or membranes are also contemplated. Also contemplated is the use of t-butylhydroperoxide instead of hydrogen peroxide; potassium hydroxide instead of sodium hydroxide as an alkaline reagent and ethanol and i-propanol instead of methanol as non-solvent.

All such obvious modifications are within the full intended scope of the appended claims.

We claim:

1. A porous shaped substrate comprising polyacrylonitrile or a copolymer thereof containing nitrile groups, said substrate having a hydrophilic surface consisting of evenly distributed amide groups formed from said nitrile groups, said amide groups comprising between about 1.8 mole percent to less than about 15 mole percent of the total nitrile groups, said surface containing imide or carboxyl groups, said substrate being substantially non-swellable in water and able to resist hydrostatic pressures in columnar beds of up to about 3000 psi without collapsing.

2. The substrate of claim 1 in a shape selected from the group consisting of a membrane, a fiber and a bead.

3. The substrate of claim 2 wherein the substrate has the shape of a porous and comprises a polyacrylonitrile copolymer.

4. The substrate of claim 3 wherein said substrate comprises greater than about 90 mole percent acrylonitrile.

5. The substrate defined in claim 3 wherein the bead is substantially isotropic.

6. The substrate defined in claim 3 wherein the substrate has a pore volume not substantially less than about 1.5 ml/g.

7. The substrate defined in claim 3 wherein said polyacrylonitrile copolymer comprises acrylonitrile copolymerized with a ($C_2$–$C_6$) mono-olefin, an alkenyl aromatic, a vinyl aromatic, a vinyl halide, a ($C_1$–$C_6$) alkyl (meth)arcylate, an acrylamide, a methacrylamide, a vinyl pyrrolidone, ($C_1$–$C_6$) hydroxy alkyl(meth)acrylate, a (meth)acrylic acid, or an acrylomethylpropylsulfonic acid or a blend of any of the foregoing.

8. The substrate in claim 3 wherein said polyacrylonitrile copolymer comprises acrylonitrile copolymerized with a methyl acrylate.

9. The substrate defined in claim 3 wherein the bead has an average bead diameter from about 5 microns to about 2 millimeters.

10. The substrate defined in claim 3 wherein the bead ha an average bead diameter from about 5 to about 150 microns.

11. The substrate defined in claim 10 wherein the bead has an average diameter from about 5 to about 20 microns.

12. The substrate defined in claim 10 wherein the bead has an average bead diameter from about 20 to about 150 microns.

13. The substrate defined in claim 3 wherein the bead has an average pore diameter from about 0.002 to about 5 microns.

14. The substrate defined in claim 13 wherein the bead has an average pore diameter from about 0.1 to about 1 micron.

15. The substrate defined in claim 13 wherein the bead has an average pore diameter from about 0.002 to about 0.1 microns.

16. The substrate defined in claim 3 further comprising a compound at least partially filling the pores of said porous bead.

17. The substrate defined in claim 16 wherein said compound is selected from a protein, a polysaccharide, a nucleic acid, a dye, or a mixture of any of the foregoing.

18. The substrate defined in claim 16 wherein said compound comprises a protein.

19. The substrate defined in claim 16 wherein the bead has a pore diameter at least about 3 times the diameter of said compound.

20. The substrate defined in claim 3 wherein at least part of said amide groups, said nitrile groups, or a mixture of said groups, are reduced to aminomethyl groups.

21. The substrate defined in claim 20 wherein at least part of said aminomethyl groups are converted to succinylated aminomethyl groups.

22. The substrate defined in claim 21 wherein at least part of said succinylated aminomethyl groups are covalently bonded to a bioactive ligand.

23. The substrate defined in claim 22 wherein said succinylated aminomethyl groups covalently bonded with a bioactive ligand are further complexed with a biologically active substance.

24. The substrate defined in claim 23 wherein said biologically active substance comprises an enzyme.

25. The substrate defined in claim 24 wherein said bioactive ligand comprises p-aminobenzamidine and said enzyme comprises acetylcholinesterase.

26. A process for the preparation of a porous shaped substrate comprising polyacrylonitrile or a copolymer thereof containing nitrile groups, said substrate being able to resist hydrostatic pressure sin columnar beds of up to about 3000 psi without collapsing and having a hydrophilic surface consisting of evenly distributed amide groups formed from said nitrile groups, said amide groups comprising from about 1.8 mole percent to less than about 15 mole percent of the total nitrile groups, said process comprising;

(a) forming a suspension by combining;

(i) a porous shaped substrate comprising polyacrylonitrile r a copolymer containing nitrile groups thereof;

(ii) an alkaline catalyst; and (iii) a liquid nonsolvent for the substrate;

(b) adding a peroxide to said suspension and heating the resultant suspension until between about 1.8 mole percent to about 15 mole percent of the total nitrile groups are hydrolyzed to amide groups and recovering the resulting substrate, said substrate being insoluble in said non-solvent and (c) (1) being substantially non-swellable in water, (2) no imide or carboxyl groups and (3) having said hydrostatic pressure resistance.

27. The process defined in claim 26 wherein said substrate has a shape selected from the group consisting of hollow fibers, porous fibers, acrylic yarns, fibrilated fibers, porous and non-porous membranes, semi-permeable membranes and porous and non-porous beads.

28. The process defined in claim 26 wherein the liquid nonsolvent is methanol.

29. The process defined in claim 26 wherein said alkaline catalyst of step (a) Iii) comprises sodium hydroxide.

30. The process defined in claim 26 wherein step (a) further comprises adding as component (iv) a reaction addition to said suspension.

31. The process defined in claim 30 wherein said step (a) (iv) additive comprises dimethylsulfoxide.

32. The process defined in claim 26 wherein said peroxide of step (b) comprises hydrogen peroxide.

33. The process defined in claim 26 wherein said step (a) further comprises adding water to said suspension.

34. The process defined in claim 26 wherein the suspension is neutralized after step (b) and before step (c) with an acidic reagent.

35. The process defined in claim 26 wherein recovery step (c) comprises washing the substrate with 0.1N hydrochloric acid, water and methanol, and then separating and drying the substrate.

36. The process defined in claim 26 wherein the substrate of step (a)Ii) is annealed prior to being combined in suspension with component (ii).

37. The process defined in claim 26 wherein said annealing comprises heating the substrate at a temperature of about 50° to 90° C. in a non-solvent for about one hour, drying the substrate and then heating the substrate at a temperature of about 90° C. for about 0.5 hours.

38. The process as defined in claim 26 wherein recovery step (c) comprises sequential washing of the substrate with water, salts, water, buffer, water, and salts.

39. The process defined in claim 38 wherein the salts comprise sodium chloride, sodium hypophosphate, or sodium azide and the buffer comprises sodium bicarbonate.

40. The process defined in claim 26 further comprising step (d)(i) of reducing at least part of said amide, said nitrile, or a mixture thereof to amine groups.

41. The process as defined in claim 40 further comprising step (d)(ii) of succinylating said amine groups to convert at least part of them to groups containing carboxyl functionality at the terminus of the pendant group.

42. The process defined in claim 41 further comprising step (d)(iii) of activating by reaction with carboxidiimide and (d)(iv) attaching a bioactive ligand thereto.

43. The process defined in claim 42 further comprising employing said substrate having said ligands attached thereto to form complexes with enzymes to separate said enzymes from enzyme-containing solutions.

44. The process defined in claim 43 wherein said ligand comprises p-aminobenzamidine and said enzyme, comprises acetylcholinesterase.

45. The process defined in claim 26 further comprising employing said substrate to form complexes with biologically active substances to separate said substances from solutions in which they are contained.

46. The process defined in claim 45 wherein said biologically active substances comprise enzymes.

47. A process for the preparation of a substantially skinless porous polymer bead substrate comprising polyacrylonitrile or a copolymer thereof containing nitrile groups, said substrate being able to resist hydrostatic pressures in columnar beds of up to about 3000 psi without collapsing and having a hydrophilic surface consisting of evenly distributed amide groups, said amide groups comprising from about 1.8 to less than about 15 mole percent of the total nitrile groups, said process comprising:
  (a) forming a suspension by combining ;
    (i) a substantially skinless porous bead substrate comprising polyacrylonitrile or a copolymer thereof containing nitrile groups prepared by a thermal induced phase separation process;
    (ii) an alkaline catalyst; and
    (iii) a liquid nonsolvent for the bead substrate,
  (b) adding a peroxide to said suspension and heating the resultant suspension until between about 1.8 mole percent to about 15 mole percent of the total nitrile groups are hydrolyzed to amide groups
  (c) and recovering the resultant bead substrate, said bead substrate being insoluble in the nonsolvent and (1) is substantially non-swellable in water, (2) said surface containing no imide or carboxyl groups and (3) having said hydrostatic pressure.

48. The process defined in claim 47 wherein the liquid non-solvent is methanol.

49. The process defined in claim 47 wherein said alkaline catalyst of step (a)(ii) comprises sodium hydroxide.

50. The process defined in claim 47 wherein step (a) further comprises adding as component (iv) a reaction additive to said suspension.

51. The process defined in claim 50 wherein said step (a)(iv) additive comprises dimethylsulfoxide.

52. The process defined in claim 47 wherein said peroxide of step (b) comprises hydrogen peroxide.

53. The process defined in claim 47 wherein said step (a) further comprises adding water to said suspension.

54. The process defined in claim 47 wherein the suspension is neutralized after step (b) and before step (c) with an acidic reagent.

55. The process defined in claim 47 wherein recovery step (c) comprises washing the bead substrate with 0.1N hydrochloric acid, water and methanol, and then separating and drying the bead substrate.

56. The process defined in claim 47 wherein the bead substrate of step (a)(i) is annealed prior to being combined in suspension with component (ii).

57. The process defined in claim 56 wherein said annealing comprises heating the bead substrate at a temperature of about 50° to 90° C. in a non-solvent for about one hour, drying the bead substrate, and then heating the bead substrate at a temperature of about 90° C. for about 0.5 hours.

58. The process defined in claim 47 wherein recovery step (c) comprises sequential washing of the bead substrate with water, salts, water, buffer, water, and salts.

59. The process defined in claim 58 wherein the salts comprise sodium chloride, sodium hypophosphate, or sodium axide and the buffer comprises sodium bicarbonate.

60. The process defined in claim 7 further comprising step (d)(i) of reducing at least part of said amide, said nitrile, or a mixture thereof to amine groups.

61. The process defined in claim 60 further comprising step (d)(ii) of succinylating said amine groups to convert at least part of them to groups containing carboxyl functionality at the terminus of the pendant groups.

62. The process defined in claim 61 further comprising step (d)(iii) of activating by reaction with carboxidiimide and (d)(iv) attaching a bioactive ligand thereto.

63. The process defined in claim 62 further comprising employing said bead substrate having said ligands attached thereto to form complexes with enzymes to separate said enzymes from enzyme-containing solutions.

64. The process defined in claim 63 wherein said ligand comprises p-aminobenzamidine and said enzyme comprises acetylcholinesterase.

65. The process defined in claim 7 further comprising employing said bead substrate to form complexes with biologically active substances to separate said substances from solutions in which they are contained.

66. The process defined in claim 65 wherein said biologically active substances comprise enzymes.

* * * * *